United States Patent [19]
Ahern, Jr.

[11] 3,923,385
[45] Dec. 2, 1975

[54] NOSEPIECE AND NOSEPIECE ATTACHMENT FOR METAL FRAMES
[75] Inventor: John F. Ahern, Jr., Barrington, R.I.
[73] Assignee: Itek Corporation, Lexington, Mass.
[22] Filed: Aug. 14, 1974
[21] Appl. No.: 497,783

[52] U.S. Cl. ............................... 351/132; 351/138
[51] Int. Cl.² ........................................... G02C 5/02
[58] Field of Search ............ 351/132, 138, 124, 128

[56] References Cited
UNITED STATES PATENTS

| | | | |
|---|---|---|---|
| 2,243,770 | 5/1941 | Nerney | 351/132 X |
| 3,233,956 | 2/1966 | DeAngelis | 351/132 X |
| 3,345,121 | 10/1967 | DeAngelis | 351/128 X |
| 3,758,203 | 9/1973 | Lipchik et al. | 351/132 X |

Primary Examiner—Paul A. Sacher
Attorney, Agent, or Firm—Homer O. Blair; Robert L. Nathans; Gerald H. Glanzman

[57] ABSTRACT

A one-piece plastic nosepiece for metal eyeglass frames together with an improved manner of attaching the nosepiece to the frames. A groove extending across substantially the entire width of the arched portion of the nosepiece is mated with a lip defining member associated with the bridge member of the frames and then locked into position by a pair of vertical screws extending through both the lip and the nosepiece. This manner of attachment provides a sturdy product that can effectively withstand rough treatment without breaking or moving out of adjustment.

In addition, because the nosepiece can be securely attached to the frames along its upper arched portion, its depending side portions need not be attached to the frames and can be left "floating" behind the eye wires. Accordingly, by making the nosepiece from a heat softenable thermoplastic material, it becomes possible to soften and then adjust the shape of the nosepiece while on the frames so as to properly fit a particular wearer. This adjustment capability, together with the inherent resiliency of the floating side portions, reduces the number of nosepiece sizes and shapes that must be manufactured, and, hence, provides a more marketable product.

5 Claims, 2 Drawing Figures

NOSEPIECE AND NOSEPIECE ATTACHMENT FOR METAL FRAMES

BACKGROUND OF THE INVENTION

1. Field of the Invention

The present invention relates generally to an improved nosepiece for eyeglasses, and, more particularly, to a one-piece plastic nosepiece for metal frames together with an improved manner for attaching the nosepiece thereto.

2. Description of the Prior Art

Probably the most common type of eyeglass mounting consists of a pair of nose pads connected directly or indirectly to each of the lens supporting portions of the frame and adapted to rest against opposite sides of the nose. The main advantage of this type of mounting is that the pads can be fairly easily adjusted to fit different wearers and, accordingly, need not be manufactured in a wide variety of different sizes and shapes. A major disadvantage of this form of mounting, however, is that the pads must fit rather tightly against the nose to prevent the glasses from dropping down on the wearer's face. This tends to produce discomfort to the wearer and can cause considerable irritation to the skin, and, after years of wear, can even deform the cartilege of the nose. Also, because they generally protrude from the body of the frame, nose pads are quite susceptible to being broken or displaced due to rough handling.

It is generally known that the one-piece or "saddle" type of nosepiece, when properly fitted, is much more comfortable to the wearer. This is because such a nosepiece presents a larger contact area to the nose and, hence, a better weight distribution over the nose. As a rule, however, saddle nosepieces are not adjustable, and, therefore, must be provided in a relatively large variety of different sizes and shapes to accommodate different wearers. Also, many of the one-piece constructions now available are not attached to the frames in a manner that can effectively withstand rough treatment.

SUMMARY OF THE INVENTION

In accordance with the present invention, an improved one-piece plastic nosepiece has been provided that avoids many of the deficiencies discussed above. In particular, the present invention provides a plastic nosepiece for metal frames that has no protruding portions, that can be adjusted to a particular wearer, and, that can be attached to the frames in a manner that can effectively withstand rough treatment without breaking or moving out of alignment.

In accordance with the presently most preferred embodiment, the nosepiece is constructed to have a groove extending substantially across its width adjacent the upper arched portion thereof. This groove is sized to mate with a lip defining member formed on or attached to the bridge of the frames and is then locked to the lip by a pair of screws extending through both the lip and the arched portion of the nosepiece. This manner of attachment is able to withstand rough treatment in a manner superior to those found in most designs and, thus, is less likely to break or move out of adjustment. This makes the construction especially suitable for use in children's frames.

A further feature of the invention is that the nosepiece is attached to the frames only along its upper arched portion, and, unlike most designs, the depending side portions of the nosepiece are not attached to the lens receiving portions of the frame. Because of this and because the nosepiece is made of a heat softenable thermoplastic material, it is possible to heat the nosepiece while on the frames and then slightly adjust it to accommodate a particular wearer. Accordingly, the present invention makes it unnecessary to provide a large inventory of different sized and shaped nosepieces to fit different wearers. As few as three sizes have been found to be sufficient to accommodate most wearers. Also, because the side portions are not attached to the frames, the inherent resiliency of the plastic nosepiece helps it to better conform to the nose.

Further features of the invention will be set forth hereinafter in conjunction with the detailed description of the drawings.

DETAILED DESCRIPTION OF THE PREFERRED EMBODIMENT

Figure 1:
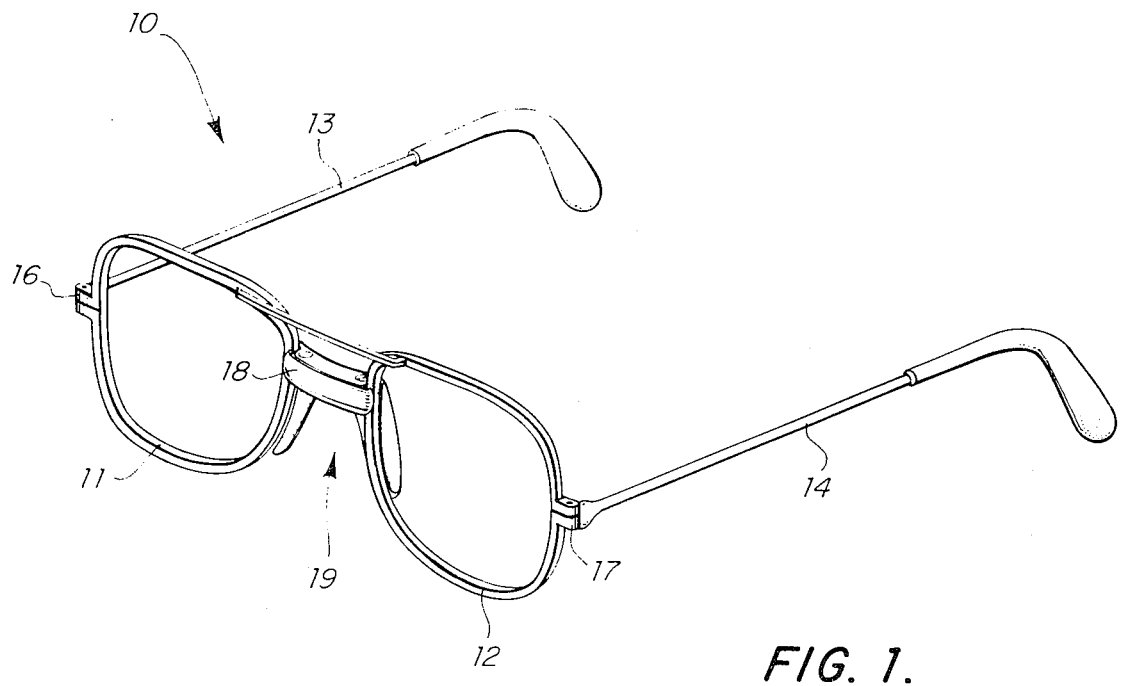
FIG. 1 illustrates a pair of eyeglasses incorporating a nosepiece in accordance with a presently preferred embodiment of the invention.

FIG. 1 illustrates a pair of eyeglasses employing a nosepiece according to the present invention. These eyeglasses generally identified by reference number 10 are of generally conventional construction, although preferably of the metal frame variety, and include a pair of lens receiving portions or eye wires 11 and 12 adapted to receive a pair of lenses of any type such as sunglass lenses, prescription lenses, multi-focal lenses, etc. The eyeglasses additionally include the usual temple members 13 and 14 which are attached to the eye wires by hinges 16 and 17, respectively. The eye wires themselves are coupled together by a metal bridge member 18 as by soldering or the like.

Figure 2:
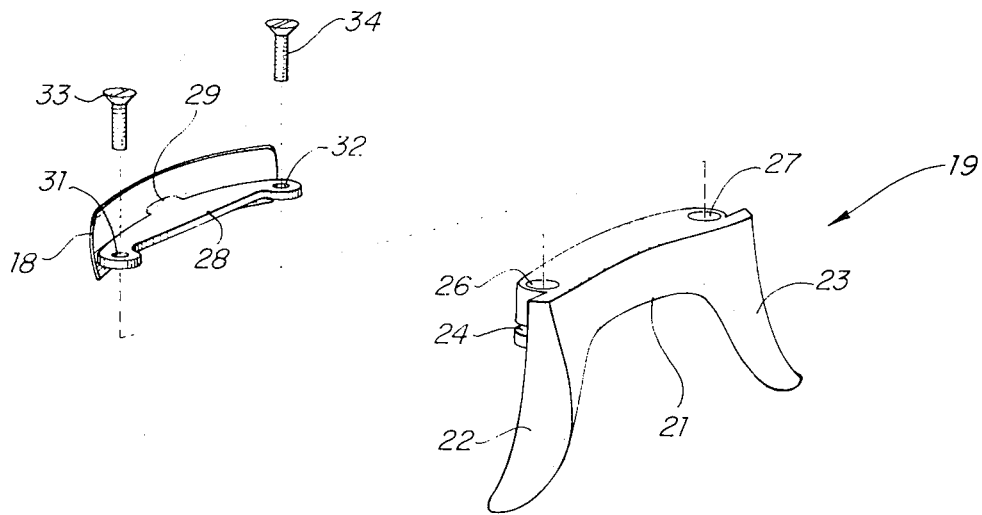
FIG. 2 illustrates a portion of the eyeglasses of FIG. 1 in an exploded view to better illustrate the specific features of the invention.

Also illustrated in FIG. 1 is a plastic nosepiece 19 according to a presently preferred embodiment of the invention. The specific construction of this nosepiece as well as the manner in which it is attached to the spectacle frame is more clearly illustrated in the exploded view of FIG. 2.

Preferably, nosepiece 19 comprises a single piece of transparent plastic formed to substantially the shape desired by any conventional injection molding technique. The presently most preferred material for the nosepiece is cellulose acetate, however, other materials may also be utilized. Thermoplastic materials which are fairly rigid and hold their shape but which can be softened by heat and then deformed are most preferred for reasons to be explained hereinafter. Nosepiece 19 includes an upper arched portion 21 which is adapted to engage the upper part of the nose of the wearer and a pair of depending side portions 22 and 23 integral therewith and adapted to engage the sides of the wearer's nose.

In order to secure nosepiece 19 to the frame in a manner that will ensure a very sturdy attachment without protruding screws or wires, the following structure is provided. Initially, the plastic nosepiece is formed to have a generally horizontal groove 24 extending substantially across the width of the front surface of the arched portion 21. On the other hand, a lip defining member in the form of a thin bar 28 is secured to the back surface of the metal bridge member 18 as by soldering at one or more locations therealong such as illustrated by solder joint 29. Although the bridge member 18 and lip 28 could be manufactured as a single unit, it is generally easier to manufacture them as two separate pieces and then attach them together as illustrated. Lip 28 is adapted to accurately mate with groove 24 across substantially the entire width of the nosepiece and bridge so that upon their being coupled, a rigid secure attachment will result. To complete the construction, a pair of substantially vertical screw holes 26 and 27 are formed in the nosepiece and are aligned with a second pair of screw holes 31 and 32 extending through lip 28 so that the two pieces may be locked in position by screws 33 and 34. Preferably, screw holes 26 and 27 in the nosepiece are countersunk so that the screws may be screwed completely into the nosepiece without protruding.

With the above-described construction, the nosepiece will be mounted to the bridge in an interlocking manner substantially across its entire width and locked thereto with a pair of embedded screws. Accordingly, the nosepiece will be held very rigidly in its mounted position and will be able to withstand a substantial amount of rough handling without breaking or moving out of alignment. Furthermore, the nosepiece attached in this manner will very nicely conform to the frames and not provide any significant protrusions which would increase its susceptibility to breakage.

Because of the above-described manner of attachment, yet other advantageous features are provided. Specifically, because the nosepiece is very securely attached to the bridge 18 through lip 28, it has been found to be unnecessary to also attach the side portions 22 and 23 to the eye wires 11 and 12 as is done in most constructions to ensure sufficient strength. Instead, although they are preferably shaped to generally conform to the eye wires, side portions 22 and 23 are allowed to hand free and unencumbered and "float" behind or adjacent to the eye wires. Because they hang free, their inherent resiliency is not impaired and thus they are better able to conform to the shape of the wearer's nose and provide a more confortable fit. Additionally, and as mentioned above, the nosepiece is preferably made of some thermoplastic material which is capable of being softened by heating. Because of this property and also because the side portions 22 and 23 are allowed to hang free, it is possible to soften them while in position on the frames, and then slightly adjust or re-shape them while softened so that they will better fit a particular wearer. This could not effectively be done if the side portions were secured to the eye wires as in most frames.

Because of these adjustment capabilities, it has been found to be unnecessary to manufacture the nosepiece in a large number of different sizes and/or shapes to accommodate different wearers. Instead, only about three sizes have been found to be adequate to fit the vast majority of wearers. This reduces manufacturing and inventory expenses and makes the frames a more attractive product.

In general, the nosepiece according to the present invention together with the manner for attaching it to the frames results in an improved, more marketable product having a reduced susceptibility to breakage or misalignment. It is quite attractive in design and inexpensive to manufacture and can be utilized on metal frames of all types.

While what has been described is a presently most preferred embodiment, it should be apparent that many additions, omissions and modifications could be made without departing from the invention. Accordingly, it should be understood that the invention should be limited only insofar as required by the scope of the following claims.

I claim:

1. A metal eyeglass frame comprising, in combination:
   a. a pair of lens receiving portions;
   b. a bridge member connecting said lens receiving portions;
   c. a nosepiece, said nosepiece comprising a single piece of plastic material and including an upper arched portion adapted to engage the upper part of the nose of a wearer and a pair of side portions depending from said arched portion and adapted to engage the sides of the nose of said wearer; and
   d. means for rigidly coupling said nosepiece to said bridge member, said coupling means including:
      i. means for interlocking the arched portion of said nosepiece to said bridge member, said interlocking means including means for defining a lip extending substantially across the width of one of said bridge member and arched portion and means for defining a groove extending substantially across the width of the other of said bridge member and said arched portion for mating with said lip; and
      ii. fastening means for rigidly fastening said nosepiece and bridge member together in said interlocked condition e. said means for defining a lip comprises a metal bar extending substantially across the width of said bridge member and protruding therefrom; and f. said means for defining a groove extending substantially across the width of said arched portion of said nose piece for mating with said metal bar.

2. A metal eyeglass frame as recited in claim 1 wherein said fastening means includes:
   a. a first pair of substantially vertical apertures extending through said arched portion of said nosepiece;
   b. a second pair of substantially vertical apertures extending through said metal bar in alignment with said apertures in said arched portion; and
   c. a pair of screws extending through said apertures for fastening said nosepiece to said bridge.

3. A metal eyeglass frame as recited in claim 2 wherein said first pair of apertures are countersunk such that said pair of screws are substantially embedded within said apertures without protruding therefrom.

4. A metal eyeglass frame as recited in claim 1 wherein said side portions float freely adjacent the lens receiving portions of said frame whereby the inherent resiliency of said side portions allow them to better conform to the nose of the wearer of said frames.

5. A metal eyeglass frame as recited in claim 1 wherein said nosepiece is formed of a heat softenable thermoplastic material capable of being slightly deformed when heated for adjustment to the nose of the wearer of said frames.

* * * * *